US012793489B2

(12) United States Patent
Fisher

(10) Patent No.: US 12,793,489 B2
(45) Date of Patent: Nov. 10, 2026

(54) ELECTRONIC LOCKBOX WITH SELLER CONSIDERATION CONTEXTUAL DATA

(71) Applicant: SentriLock, LLC, Cincinnati, OH (US)

(72) Inventor: Scott R. Fisher, West Chester, OH (US)

(73) Assignee: SentriLock, LLC, Cincinnati, OH (US)

( * ) Notice: Subject to any disclaimer, the term of this patent is extended or adjusted under 35 U.S.C. 154(b) by 0 days.

(21) Appl. No.: 19/257,905

(22) Filed: Jul. 2, 2025

(65) Prior Publication Data

US 2026/0011195 A1 Jan. 8, 2026

Related U.S. Application Data

(60) Provisional application No. 63/673,950, filed on Jul. 22, 2024, provisional application No. 63/667,499, filed on Jul. 3, 2024.

(51) Int. Cl.
*G07C 9/00* (2020.01)
*G06Q 50/163* (2024.01)
*H04W 4/80* (2018.01)
*G06Q 50/16* (2012.01)

(52) U.S. Cl.
CPC ....... *G07C 9/00896* (2013.01); *G06Q 50/163* (2013.01); *G07C 9/00309* (2013.01); *G07C 9/00571* (2013.01); *H04W 4/80* (2018.02); *G06Q 50/167* (2013.01)

(58) Field of Classification Search
CPC ............ G07C 9/00896; G07C 9/00309; G07C 9/00571; G07C 2009/00936; G06Q 50/163; G06Q 50/167; H04W 4/80
See application file for complete search history.

(56) References Cited

U.S. PATENT DOCUMENTS

2011/0251876 A1* 10/2011 Fisher ................ G06Q 30/0216 713/168
2012/0246024 A1* 9/2012 Thomas ................. G06Q 30/06 705/27.1
2021/0398229 A1* 12/2021 Coca .................. G07C 9/00896

* cited by examiner

*Primary Examiner* — An T Nguyen
(74) *Attorney, Agent, or Firm* — Frederick H. Gribbell; Russell F. Gribbell; William E. Crouse

(57) ABSTRACT

An electronic lockbox stores "seller consideration contextual data," often referred to as a "seller's offer." When a showing agent arrives at the property that is protected by this lockbox, the showing agent must produce authentication information to obtain access to the lockbox's secure compartment, and then the seller's offer will be sent from the lockbox to the showing agent's smart phone, and then displayed on its touchscreen. For increased security, one important optional feature is to require the showing agent to accept the "seller's offer" as a condition precedent, before allowing him to access the contents of the lockbox.

16 Claims, 7 Drawing Sheets

GENERAL CASE - ENTERING SELLER'S OFFER AS CONTEXTUAL DATA

ELECTRONIC LOCKBOX WITH SELLER CONSIDERATION CONTEXTUAL DATA

CROSS-REFERENCE TO RELATED APPLICATIONS

The present application claims priority to provisional patent application Ser. No. 63/667,499, titled "ELECTRONIC LOCKBOX WITH SELLER CONSIDERATION CONTEXTUAL DATA," filed on Jul. 3, 2024; and claims priority to provisional patent application Ser. No. 63/673,950, titled "ELECTRONIC LOCKBOX WITH SELLER CONSIDERATION CONTEXTUAL DATA," filed on Jul. 22, 2024.

TECHNICAL FIELD

The technology disclosed herein relates generally to electronic locks and electronic lockbox systems and is particularly directed to a system of the type that includes a wireless portable computer (sometimes referred to herein as a smart device, or a smart phone) that communicates with an electronic lockbox using a low power radio link. An embodiment is specifically disclosed as a wireless portable computer that includes both a low power radio to communicate to the lockbox and a wide area network radio to communicate to a central clearinghouse computer.

A further embodiment is disclosed involving the wireless portable computer that communicates to an electronic lockbox using a low power radio and that communicates to a central clearinghouse computer using a wide area network radio. In more advanced applications, the wireless portable computer can comprise a smart phone, which can run application software programs (called "APPS"), to customize the functions executed by the smart phone, and to allow certain information residing either on the electronic lockbox or on the central computer to be downloaded to the smart phone, and then displayed on the smart phone's touch screen display. Also, the APP would be able to allow information residing in the memory of the wireless portable computer (the smart phone) to be uploaded to an electronic lockbox or to the central computer, using the appropriate communications links.

The overall system with one or more electronic lockboxes has the ability for the lockbox to send identifying data to the wireless portable computer via a low power radio which then can relay that data to the central clearinghouse computer, generating a response from the central clearinghouse computer that contains one or more data elements with customized information of special interest to the user of the wireless portable computer. Such data elements can include information relating to the property to which the electronic lockbox is attached, and/or data relating to other similar properties in the geographic area. The data elements also could comprise configuration data relevant to the electronic lockbox, thereby updating the lockbox remotely and updating diagnostic data for the lockbox that allows near real time diagnostics from a support center located remote to the lockbox.

The electronic lockbox of the present technology is also designed to store a type of data, generally referred to herein as "seller consideration contextual data." More specifically, this type of data will often be referred to herein as "seller's offer" contextual data (or simply a "seller's offer"), which typically is initially created by a "listing agent" of a property that will be offered for sale or for rent. The listing agent will typically create this "seller's offer" data on his or her wireless portable computer, and then upload that "seller's offer" as a data packet to a specific lockbox, where it is stored for later use. In general, that lockbox will later be accessed by one or more "showing agents" who are typically real estate agents (also referred herein to as "sales agents"), who arrive at the given property to "show" that property to a potential buyer or renter.

As part of the overall authentication/authorization procedure that must be performed before the showing agent is able to access the contents of the lockbox, the "seller's offer" data packet will be downloaded from the lockbox to the wireless portable computer of the showing agent, where that data packet will be displayed on the touchscreen display of the showing agent's wireless portable computer (e.g., a smart phone) as contextual data. Various optional features are made available to the listing and showing agents of such transactions, but in general, the "seller's offer" would typically be some type of compensation that would be offered to the buyer or to the buyer's agent (e.g., the showing agent) if the property is purchased, for example. The exact compensation would likely be a fixed dollar amount, or a percentage of the sales price, or some other form of legal consideration as part of forming a contract for purchasing the property of interest.

An optional feature of this system is to require the listing agent to actually create and upload a "seller's offer" to each lockbox in the overall real estate broker's system. This optional feature would be enforced, if a "seller's offer" has not yet been uploaded to a given lockbox, by preventing that lockbox from allowing its shackle to be locked when the listing agent attempts to install the lockbox at a property site, or by preventing that lockbox from allowing its removable key compartment (the "secure compartment") from being locked when the listing agent attempts to install the lockbox at a property site. Typically, both of those installation operations must successfully occur, or the lockbox would not be able to perform its intended security function. By describing this feature as "optional," it is predicted that the "seller's offer" will become a popular feature in at least the real estate sales sector of the economy, especially if the showing agents are all required to accept the terms and conditions that are part of the "seller's offer" contract provisions, or they will not be able to access the key compartment. Furthermore, if a given regional real estate Board decides that every electronic lockbox in that Board's (MLS) lockbox system must contain a "seller's offer," then this optional feature would not be optional at all-at least in that Board's region. Therefore, it would be preferred for every electronic lockbox that would have a "seller's offer" capability have its internal computer program also include an optional "flag" that allows such electronic lockboxes to be set (e.g., by a user, or by the Board) to require each listing agent's lockbox to contain a "seller's offer," as described hereinbelow.

STATEMENT REGARDING FEDERALLY SPONSORED RESEARCH OR DEVELOPMENT

None.

SUMMARY

It is an advantage to provide an electronic lockbox system in which data can be delivered to a user in real time, such that when the user (a "showing agent") approaches one of the electronic lockboxes of the system to obtain access to the contents of that lockbox, and after successfully authenticating himself and his wireless portable computer to that lockbox, the lockbox downloads a "seller's offer" as contextual data to the user's wireless portable computer, which will be displayed on that wireless portable computer (such as a smart phone).

It is another advantage to provide an electronic lockbox system in which data can be delivered to a user in real time, in which the user (a "showing agent") must first successfully authenticate himself and his wireless portable computer to that lockbox; then the lockbox will download a "seller's offer" as contextual data to the user's wireless portable computer, which will be displayed on that wireless portable computer (such as a smart phone); and in many situations for increased security, the user must now accept the "seller's offer" as a condition precedent before allowing the user to access the contents of the lockbox.

It is yet another advantage to provide an electronic lockbox system in which a "seller's offer" is stored in the memory circuit of the electronic lockbox, for later access by a "showing agent;" the owner of the electronic lockbox (who often is referred to as a "listing agent") must first upload a data packet that contains the "seller's offer" to the electronic lockbox, and the listing agent typically does so, using his own wireless portable computer (such as a smart phone).

It is still another advantage to provide an electronic lockbox system in which a "seller's offer" is stored in the memory circuit of the electronic lockbox, for later access by a "showing agent;" when the lockbox owner (a "listing agent") attempts to install the electronic lockbox at a specific (predetermined) property site, one optional feature is to ensure that the listing agent has actually uploaded a data packet that contains the "seller's offer" to that specific electronic lockbox, by preventing the lockbox's shackle from locking if no "seller's offer" has been received by that lockbox, and stored in the lockbox's memory circuit for later use by a visiting showing agent.

It is a further advantage to provide an electronic lockbox system in which a "seller's offer" is stored in the memory circuit of the electronic lockbox, for later access by a "showing agent;" when the lockbox owner (a "listing agent") attempts to place a building key into the secure compartment of the lockbox, for then installing the electronic lockbox at a specific (predetermined, for use with that building key) property site, one optional feature is to ensure that the listing agent has actually uploaded a data packet that contains the "seller's offer" to that specific electronic lockbox, by preventing that lockbox's secure compartment from locking if no "seller's offer" has been received by that lockbox, and stored in the lockbox's memory circuit for later use by a visiting showing agent.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, an electronic lockbox system is provided, which comprises: (a) an electronic lockbox, having a first processing circuit, a first memory circuit including instructions executable by the first processing circuit, a first short range wireless communications circuit, and a secure compartment having a movable lock that is under the control of the first processing circuit, wherein the electronic lockbox is assigned to a first specific property; (b) a wireless portable computer, having a second processing circuit, a second memory circuit including instructions executable by the second processing circuit, a first visual display, a first data entry circuit, a second short range wireless communications circuit, and a first WAN communications circuit for communicating with a wide area network, the wireless portable computer being assigned to a sales agent; (c) the first memory circuit contains a seller's offer data packet that may be displayed as contextual data on a visual display of another computer, and the second memory circuit contains authorization data that may be used to access a lockbox that is part of the electronic lockbox system; and (d) wherein the first and second processing circuits are programmed with computer code to perform functions of: (i) the sales agent begins an authorization routine in which the wireless portable computer sends a credentials message to the electronic lockbox, using the authorization data stored in the second memory circuit, and using the second short range wireless communications circuit; (ii) the electronic lockbox receives the credentials message, using the first short range wireless communications circuit; (iii) using the first processing circuit, the electronic lockbox determines whether or not the credentials message is authorized to unlock the electronic lockbox, and: (A) if not, then to deny access to the secure compartment, and refusing to send a seller's offer data message to the wireless portable computer, or (B) if so, then to send the seller's offer data message to the wireless portable computer, using the first short range wireless communications circuit; (iv) if the second short range wireless communications circuit receives the seller's offer data message, then the second processing circuit is operable to display the seller's offer data message as contextual data on the first visual display; and (v) if the first short range wireless communications circuit sends the seller's offer data message, then the first processing circuit is operable to conditionally unlock the secure compartment, thereby conditionally allowing access to the secure compartment.

In accordance with another aspect, a method for using an electronic lockbox system is provided, in which the method comprises: (a) providing an electronic lockbox, which includes a first processing circuit, a first memory circuit including instructions executable by the first processing circuit, a first short range wireless communications circuit, and a secure compartment having a movable lock that is under the control of the first processing circuit, wherein the electronic lockbox is assigned to a first specific property; (b) providing a wireless portable computer, which includes a second processing circuit, a second memory circuit including instructions executable by the second processing circuit, a first visual display, a first data entry circuit, a second short range wireless communications circuit, and a first WAN communications circuit for communicating with a wide area network, the wireless portable computer being assigned to a sales agent; (c) storing a seller's offer data packet in the first memory circuit, in which the seller's offer data packet may be displayed as contextual data on a visual display of another computer; (d) storing authorization data in the second memory circuit, in which the authorization data may be used to access a lockbox that is part of the electronic lockbox system; and (e) beginning an authorization routine in which the sales agent causes the wireless portable computer to send a credentials message to the electronic lockbox, using the authorization data stored in the second memory circuit, and using the second short range wireless communications circuit; (f) receiving the credentials message at the electronic lockbox, using the first short range wireless communications circuit; (g) determining whether or not the credentials message is authorized to unlock the electronic lockbox, using the first processing circuit, and: (i) if not, then denying access to the secure compartment, and refusing to send a seller's offer data message to the wireless portable computer, or (ii) if so, then sending the seller's offer data message to the wireless portable computer, using the first short range wireless communications circuit; (h) if the second short range wireless communications circuit receives the seller's offer data message, then displaying the seller's offer data message as contextual data on the first visual display, under the control of the second processing circuit; and (i) if the second short range wireless communications circuit receives the seller's offer data message, then conditionally unlocking the secure compartment, and thereby conditionally allowing access to the secure compartment, under the control of the second processing circuit.

In accordance with yet another aspect, a method for using an electronic lockbox system is provided, in which the method comprises: (a) providing an electronic lockbox, which includes a first processing circuit, a first memory circuit including instructions executable by the first processing circuit, a first short range wireless communications circuit, and a secure compartment having a movable lock that is under the control of the first processing circuit, wherein the electronic lockbox is assigned to a first specific property; (b) providing a wireless portable computer, which includes a second processing circuit, a second memory circuit including instructions executable by the second processing circuit, a first visual display, a first data entry circuit, a second short range wireless communications circuit, and a first WAN communications circuit for communicating with a wide area network, the wireless portable computer being assigned to a sales agent; (c) controlling the electronic lockbox and controlling the wireless portable computer, by a listing agent, and: (i) using the first data entry circuit, entering a seller's offer as a data packet and causing the data packet to be stored into the second memory circuit for a specific property site where the electronic lockbox will be assigned; (ii) bringing the wireless portable computer within communications range of the electronic lockbox, so that the first and second short range wireless communications circuits are able to send and receive data with one another; (iii) uploading the seller's offer data packet to the electronic lockbox, using the first and second short range wireless communications circuits, and causing the seller's offer data packet to be stored in the first memory circuit; and (iv) physically installing the electronic lockbox at the specific property site; and (d) wherein: the seller's offer data packet will later be made available, as contextual data, to an authorized sales agent who accesses the electronic lockbox.

In accordance with still another aspect, a method for using an electronic lockbox system is provided, in which the method comprises: (a) providing an electronic lockbox, which includes a first processing circuit, a first memory circuit including instructions executable by the first processing circuit, a first short range wireless communications circuit, a secure compartment having a movable lock that is under the control of the first processing circuit, and a lockable/releasable shackle that is under the control of the first processing circuit, wherein the electronic lockbox is assigned to a first specific property; (b) providing a wireless portable computer, which includes a second processing circuit, a second memory circuit including instructions executable by the second processing circuit, a first visual display, a first data entry circuit, a second short range wireless communications circuit, and a first WAN communications circuit for communicating with a wide area network, the wireless portable computer being assigned to a sales agent; and (c) controlling the electronic lockbox and controlling the wireless portable computer, by a listing agent, and: (i) physically taking the electronic lockbox to the first specific property site; (ii) releasing the shackle to allow site installation of the electronic lockbox; and (iii) determining, using the first processing circuit, whether or not the electronic lockbox has received a seller's offer data packet, and: (A) if not, then preventing the shackle from being locked; or (B) if so, then allowing the shackle to be locked.

In accordance with a further aspect, an electronic lockbox system is provided, which comprises: (a) an electronic lockbox, having a first processing circuit, a first memory circuit including instructions executable by the first processing circuit, a first short range wireless communications circuit, and a secure compartment having a movable lock that is under the control of the first processing circuit, wherein the electronic lockbox is assigned to a first specific property; (b) a wireless portable computer, having a second processing circuit, a second memory circuit including instructions executable by the second processing circuit, a first visual display, a first data entry circuit, a second short range wireless communications circuit, and a first WAN communications circuit for communicating with a wide area network, the wireless portable computer being assigned to a sales agent; (c) the first memory circuit contains a seller's offer data packet that may be displayed as contextual data on a visual display of another computer, and the second memory circuit contains authorization data that may be used to access a lockbox that is part of the electronic lockbox system; and (d) wherein the first and second processing circuits are programmed with computer code to perform functions of: (i) the sales agent begins an authorization routine in which the wireless portable computer sends a credentials message to the electronic lockbox, using the authorization data stored in the second memory circuit, and using the second short range wireless communications circuit; (ii) the electronic lockbox receives the credentials message, using the first short range wireless communications circuit; (iii) using the first processing circuit, the electronic lockbox determines whether or not the credentials message is authorized to unlock the electronic lockbox, and: (A) if not authorized, then to deny access to the secure compartment, or (B) if authorized, then: (i) to send the seller's offer data packet to the wireless portable computer, using the first short range wireless communications circuit; (ii) to display the seller's offer data packet as contextual data on the first visual display, under control of the second processing circuit; and (iii) to require the sales agent to accept or reject the displayed seller's offer using the first data entry circuit, and the second processing circuit.

In accordance with a yet further aspect, a method for using an electronic lockbox system is provided, in which the method comprises: (a) providing an electronic lockbox, which includes a first processing circuit, a first memory circuit including instructions executable by the first processing circuit, a first short range wireless communications circuit, and a secure compartment having a movable lock that is under the control of the first processing circuit, wherein the electronic lockbox is assigned to a first specific property; (b) providing a wireless portable computer, which includes a second processing circuit, a second memory circuit including instructions executable by the second processing circuit, a first visual display, a first data entry circuit, a second short range wireless communications circuit, and a first WAN communications circuit for communicating with a wide area network, the wireless portable computer being assigned to a sales agent; (c) storing a seller's offer data packet in the first memory circuit, in which the seller's offer data packet may be displayed as contextual data on a visual display of another computer; (d) storing authorization data in the second memory circuit, in which the authorization data may be used to access a lockbox that is part of the electronic lockbox system; and (e) beginning an authorization routine in which the sales agent causes the wireless portable computer to send a credentials message to the electronic lockbox, using the authorization data stored in the second memory circuit, and using the second short range wireless communications circuit; (f) receiving the credentials message at the electronic lockbox, using the first short range wireless communications circuit; (g) determining if the credentials message is authorized, using the first processing circuit, and if so, then sending the seller's offer data packet to the wireless portable computer, using the first short range wireless communications circuit; (h) displaying the seller's offer data packet as contextual data on the first visual display, under the control of the second processing circuit; (i) querying the sales agent to accept or reject the seller's offer using the first data entry circuit; (j) sending an answer message from the wireless portable computer using the second short range wireless communications circuit; and (k) unlocking the secure compartment under the control of the first processing circuit only if the answer message indicates acceptance of the seller's offer.

In accordance with a still further aspect, a method for using an electronic lockbox system is provided, in which the method comprises: (a) providing an electronic lockbox, which includes a first processing circuit, a first memory circuit including instructions executable by the first processing circuit, a first short range wireless communications circuit, and a secure compartment having a movable lock that is under the control of the first processing circuit, wherein the electronic lockbox is assigned to a first specific property; (b) providing a wireless portable computer, which includes a second processing circuit, a second memory circuit including instructions executable by the second processing circuit, a first visual display, a first data entry circuit, a second short range wireless communications circuit, and a first WAN communications circuit for communicating with a wide area network, the wireless portable computer being assigned to a sales agent; and (c) controlling the electronic lockbox and controlling the wireless portable computer, by a listing agent, and: (i) opening the movable lock of the secure compartment to obtain access; (ii) placing a building key into the secure compartment, in which the building key pertains to the first specific property; and (iii) determining, using the first processing circuit, whether or not the electronic lockbox has received a seller's offer data packet, and: (A) if not, then preventing the secure compartment from being locked; or (B) if so, then allowing the secure compartment to be locked.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
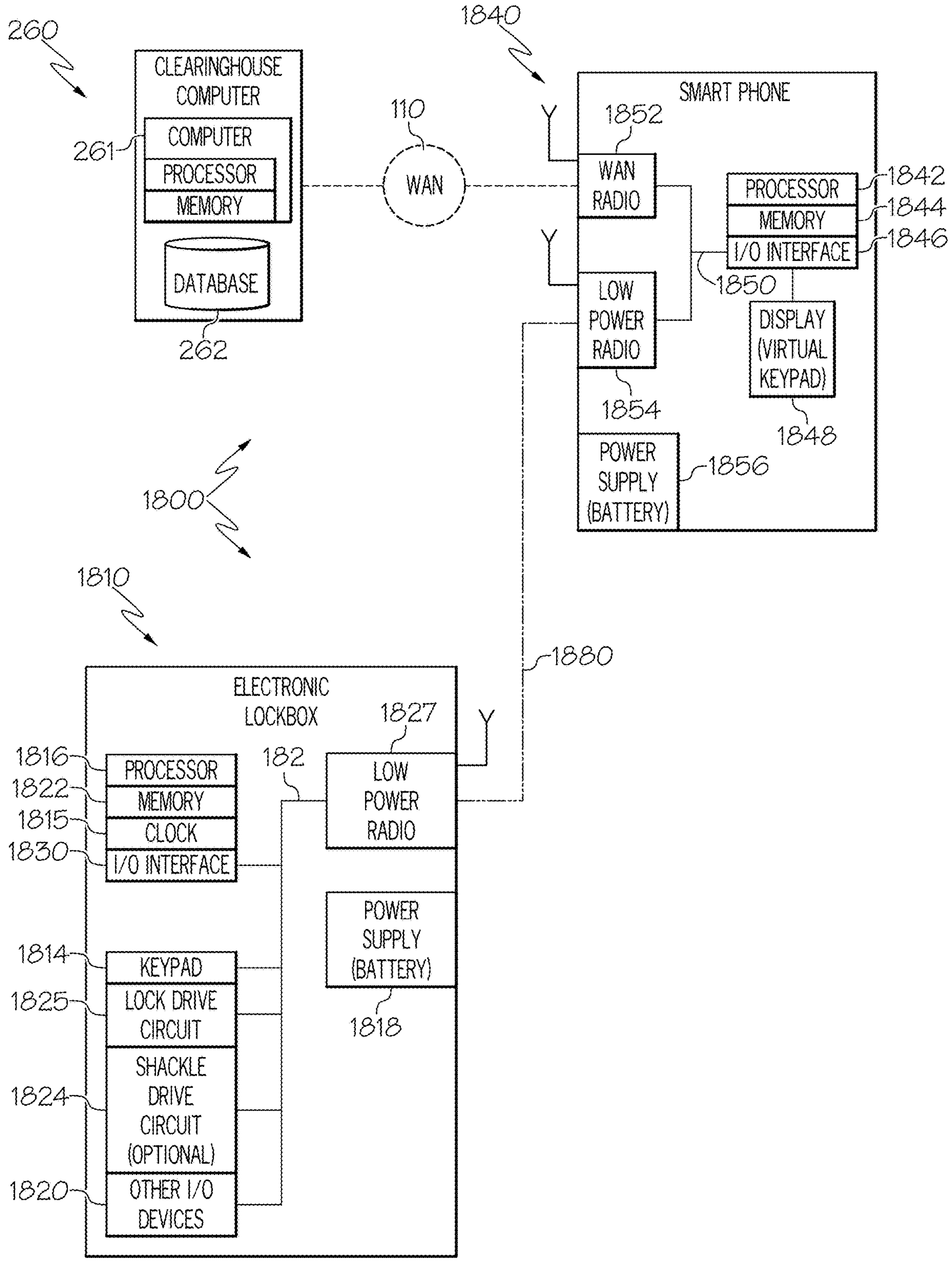
FIG. 1 is a block diagram of the major components of an electronic lockbox system, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing circuit, such as a microprocessor or an ASIC that includes a logic state machine or another form of processing element (including a sequential processing circuit). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Referring now to FIG. 1, an electronic lockbox system, generally designated by the reference numeral 1800, is depicted. The system 1800 includes one or more electronic lockboxes 1810, a central clearinghouse computer system 260 (also referred to as a "CCC"), a data communications system 110 that comprises a wide area network (a "WAN"), and a wireless smart device 1840. The central clearinghouse computer 260 typically will include a database 262 containing a repository of electronic lockbox identification and attribute information, and also contains a repository of information about real estate agents (i.e., about both listing agents and showing agents). A computer 261 controls the database 262, and includes a processing circuit and a memory circuit, multiple communications circuits, as well as other typical devices that are part of a computing center, including many WAN communications lines to talk with multiple users, virtually simultaneously.

Figure 6:
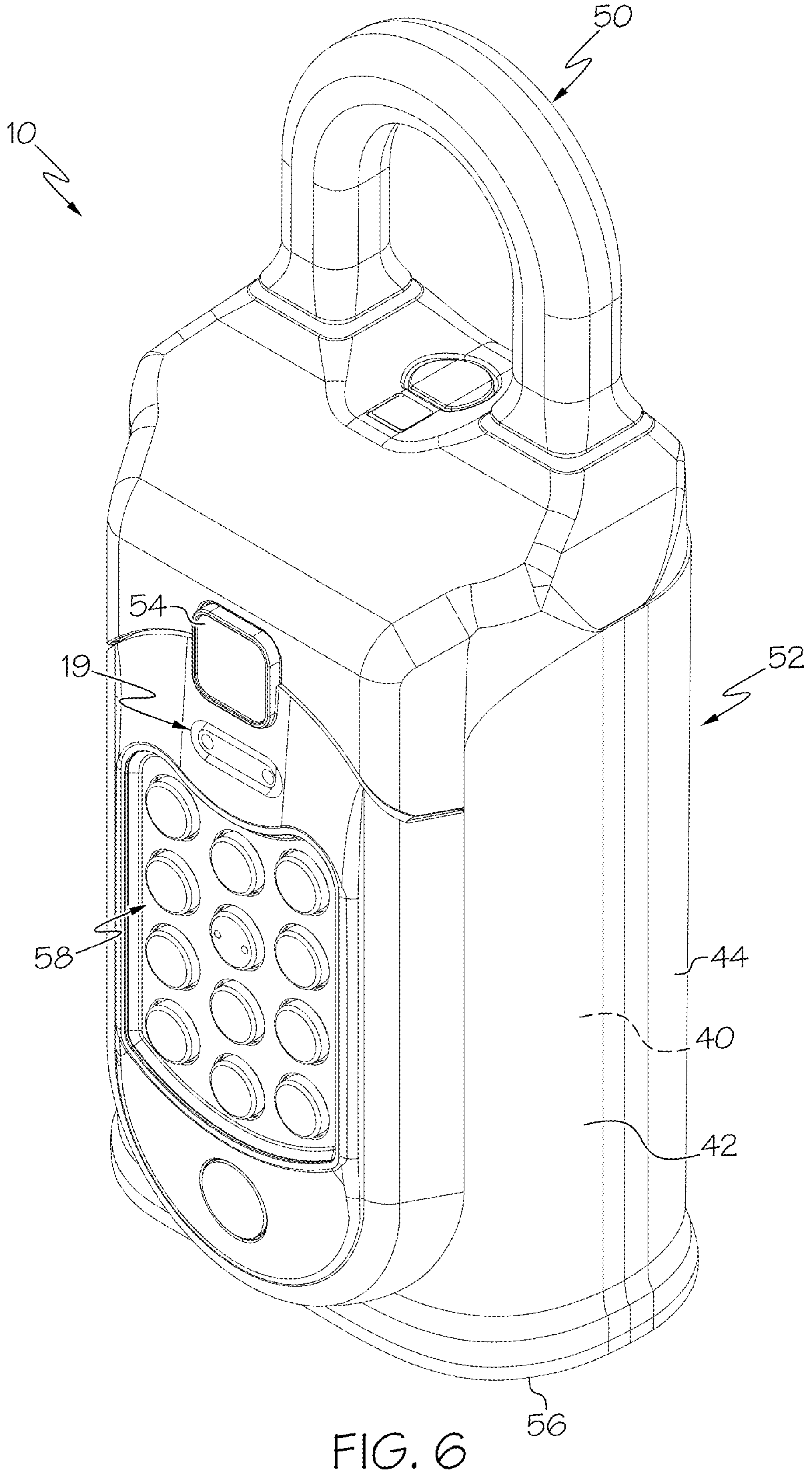
FIG. 6 is a front perspective view of the entire lockbox, as constructed according to the principles of the technology disclosed herein.

Assuming that FIG. 1 represents a real estate lockbox system, then electronic lockbox 1810 would typically (but not always) include a shackle 50 (see FIG. 6). Therefore, this lockbox would contain a processing circuit 1816, a memory circuit 1822, a calendar-type clock circuit 1815, and some type of input/output interface circuit 1830. An interface or data bus 1812 would be used to communicate from the I/O interface circuit 1830 to the various input/output devices that are mounted on or included with the electronic lockbox 1810. This may include a keypad 1814, a lock drive circuit 1825, a shackle drive circuit 1824 (which could be optional for various types of applications), as well as many other input/output devices, generally designated by the reference numeral 1820. Several such "other input/output devices" are described in other patents owned by SentriLock LLC of Cincinnati, Ohio, which are incorporated by reference in their entirety, herein. Such patents are listed below, and specifically include U.S. Pat. No. 9,704,315, titled: CONTEXTUAL DATA DELIVERY TO OTHER USERS AT AN ELECTRONIC LOCKBOX; and U.S. Pat. No. 10,068,399, titled: CONTEXTUAL DATA DELIVERY TO OTHER USERS AT AN ELECTRONIC LOCKBOX.

The electronic lockbox 1810 also includes a low power "radio" 1827 (which could be a different type of wireless device than a standard radio, for example, an optical wireless communications device), and a power supply 1818, which typically would be a battery. This lockbox could also contain a backup capacitor, or a hybrid capacitor, if desired.

It will be understood that the term "radio" in this disclosure will refer to any type of wireless communications device, including a standard radio that uses electromagnetic waves in one of the radio frequency ranges, but also including an optical communications transmitter and receiver that uses electromagnetic waves in one of so-called optical frequencies, such as visible light, and/or infrared or ultraviolet wavelength light. (It could even use higher energy electromagnetic waves such as X-rays or gamma rays, but that seems unlikely.) A sonic communications device could also be used, if desired, and the inventors will include such a device within the definition of a "radio" for this technical disclosure.

The smart device 1840 would include a processing circuit 1842, a memory circuit 1844, and an input/output interface circuit 1846, as well as a display 1848. One typical smart device that could be used would be a smart phone, and most smart phones have a touch screen display, which can also act as a virtual keypad. Some type of user input device will be necessary, so if a virtual keypad is not part of the display 1848, then some other type of input keypad or at least a numeric keypad (such as a telephone keypad) would be needed. Smart device 1840 will also have a signal or data bus 1850 that transfers signals from the I/O interface 1846 to a wide area network radio 1852, and a low power radio 1854. The smart device would also contain some type of electrical power supply 1856, such as a battery.

It will be understood that, if a smart phone is used as the smart device 1840, then the WAN 110 would typically include a cellular telephone communications system. Furthermore, the WAN 110 would also typically include the Internet, particularly for a real estate lockbox system in which the CCC 260 is located in one city, and the electronic lockboxes 1810—as well as the real estate agents and their smart phones—are located in an entirely different city and/or state. Further, the WAN 110 could be partially or entirely wireless, depending on the types of communications networks involved that make up the portions of the Internet in use for a particular situation of lockboxes and users, including the Internet of the future.

Referring now to FIG. 6, an exemplary embodiment of an electronic lockbox is generally designated by the reference numeral 10. It will be understood that this lockbox 10 on FIG. 6 is a physical representation of the electromechanical device that is also referred to on FIG. 1 as the lockbox 1810.

The illustrated lockbox 10 has an outer housing (or enclosure or casing) 52, a shackle 50, and a bottom portion of the key bin 56 which is located at the bottom portion of the casing 52. The upper housing of lockbox 10 includes two receptacles (openings) that receive the shackle 50. The shackle 50 has an upper portion and two shackle extensions that fit through the receptacles. The front of the lockbox has a keypad 58, which can be used by a sales agent or other authorized person to enter data to the lockbox's control system. Above the keypad is an indicator LED lamp 19, which will indicate various status states of the lockbox during its operations, and a label, or display, 54. The keypad 58 is attached to a front portion 42 of the housing 52, while the rear portion 44 of the housing 52 is substantially planar.

The keypad 58 may also be referred to as a "data input circuit," in which a human user may press one or more of the keys to enter data, such as numeric information. It will be understood that future versions of electronic lockboxes may someday include a touchscreen display, and in such a design, the keypad will be incorporated directly into that display, and thus the touchscreen display itself would become the data input circuit. It will also be understood that the keypad 58 on FIG. 6 is a physical representation of the electronic device 1814 on FIG. 1, which is a block diagram representation of that circuit.

As noted above, electronic lockbox 10 includes a shackle 50 that is typically used to attach the lockbox 10 to a door handle or other fixed object. Electronic lockbox 10 also includes a key compartment which typically holds a building (or dwelling) key (not shown), and which can be accessed via the key bin 40, which is removable when it is unlocked.

As noted above, the shackle 50 is not the only way a lockbox may be mounted to a building or other solid object, although that is typical in most real estate sales settings. However, the outer housing 52 of the lockbox 10 could also be provided with mounting holes, or perhaps mounting studs, in the rear portion of that housing 52, and those mounting holes or studs could be used to hard-mount the entire lockbox to the building/solid object, if desired, for a (more or less) permanent installation. This type of mounting could be more useful for commercial buildings, or industrial settings, in which the lockbox may remain mounted and used as an access control device for years after an initial sale or lease situation.

Figure 2:
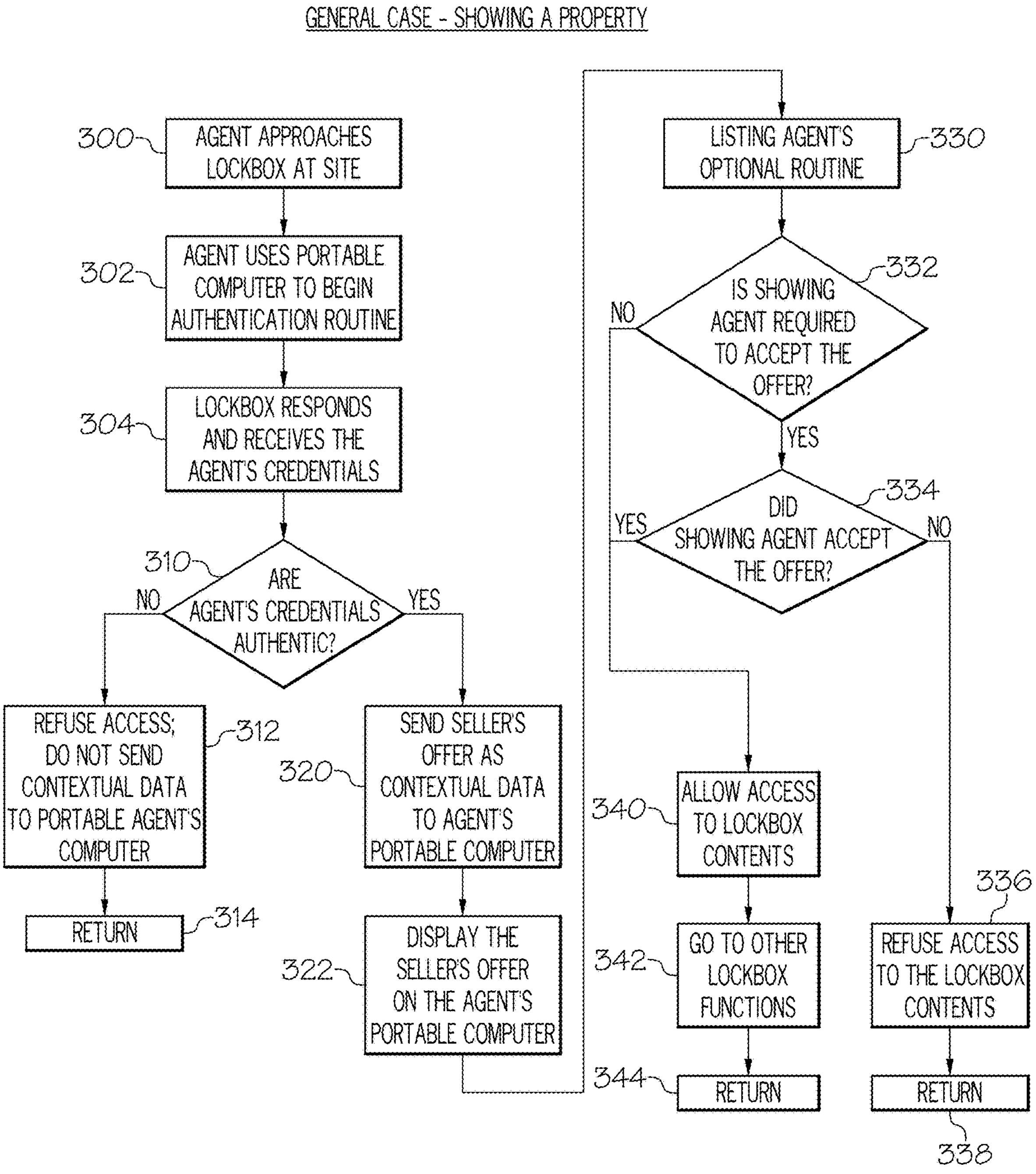
FIG. 2 is a flow chart showing some of the functions performed by a "showing agent" for the general case of showing a property that includes an electronic lockbox of the system of FIG. 1.

Referring now to FIG. 2, a flow chart is provided that depicts the general case of using this system when showing a property at a site. Starting at a function 300, a real estate agent (also sometimes referred to herein as a "sales agent") approaches a lockbox that has already been installed at the property site. In this flow chart, it is assumed that the sales agent will be doing a showing of the property to a potential buyer, and therefore, this agent is a "showing agent."

At a function 302, the sales agent uses his or her portable computer 1840 to begin an authentication routine. In this situation, the low power radio 1854 of the portable computer 1840 will be used to transmit and receive data messages with the low power radio 1827 of the lockbox 1810. At the function 302, the sales agent's wireless portable computer 1840 will send an "authorization credentials message" to the electronic lockbox 1810, using the authentication data (also sometimes referred to as "authorization data" or "credentials data") stored in the memory circuit 1844, and using the short range wireless communications circuit 1854.

Once the lockbox 1810 realizes it has received a message from the sales agent's portable computer 1840, then at a function 304 the lockbox responds with an acknowledgement message and then will receive the sales agent's credentials. At a decision function 310, the lockbox 1810 determines whether or not the sales agent's credentials are authentic (i.e., properly authorized). If the answer is NO, the lockbox will perform a function 312 and refuses access to its contents. When that occurs, the lockbox 1810 also will not send the expected contextual data message to the sales agent's portable computer 1840. In other words, if the sales agent's credentials are not authentic (i.e., they lack the necessary authorization data) at 310, then the function 312 will operate to deny access to the secure compartment 40, while also refusing to send a seller's offer data packet (the seller's offer message) to the wireless portable computer 1840. After that, the computer program of the lockbox performs a "return" function at 314.

On the other hand, if the lockbox 1810 determined at decision function 310 that the sales agent's credentials are authentic (i.e., properly authorized), then the lockbox will perform a function 320 and then sends a "seller's offer" data packet to the sales agent's portable computer 1840. After the sales agent's portable computer 1840 receives that data packet, a function 322 is performed on the sales agent's portable computer which will display the seller's offer as contextual data on the touchscreen display 119.

The control system (in this case, including the lockbox 1810 and the sales agent's portable computer 1840), runs an optional routine 330 that will be performed if the listing agent of this specific lockbox has previously decided to use this optional routine. The control system now determines at a decision function 332 whether or not the showing agent is required to accept the seller's offer. If the answer is NO, then a function 340 will be performed by the lockbox 1810, and access will be allowed to the lockbox's contents, which typically is a key to the property at that site. A function 342 is now performed in which the lockbox 1810 now performs other lockbox functions, after which a "return" function is performed at 344.

On the other hand, if the listing agent has decided that the showing agent will be required to accept the seller's offer, then the result of decision function 332 will be YES, and in that event, the lockbox's processing circuit must take further action as part of the function 332. More specifically, the lockbox's processing circuit 1816 is operable to send an acceptance query message, using the lockbox's short range wireless communications circuit 1827, in which the acceptance query message asks the sales agent to accept the seller's offer. The sales agent's wireless portable computer must now take further action as part of the function 332. More specifically, the agent's processing circuit 1842 is operable to receive the acceptance query message, using the short range wireless communications circuit 1854, and to display the acceptance query message as contextual data on the visual display 1848.

Now, if the sales agent decides to respond to the acceptance query message, the sales agent must enter some type of answer (e.g., to accept or to refuse the seller's offer), and the agent's processing circuit 1842 is operable to send an answer message, using the short range wireless communications circuit 1854.

It will be understood that the acceptance query function (at 332), if used, will provide greater security in the overall electronic lockbox system 1800. Regardless as to how generous or how stingy the "seller's offer" may be from a commercial standpoint, if this new acceptance query message is used in a real estate lockbox system, then the buyer's agent (i.e., the "showing agent" or "sales agent") must comply with whatever terms and conditions are included in the "seller's offer," or that buyer's agent would not be permitted to 'show' that property, because that lockbox would not permit access to its secure compartment. And if, for example, the prospective buyer has not already signed a real estate contract with that buyer's agent, and if—which is probable—part of the "seller's offer" requires such a contract to be in place before that property can be shown to a prospective buyer, then this important legal provision would become a 'hard' condition precedent to the showing of that property.

Another decision function 334 will now be performed which determines whether or not the showing agent has accepted the seller's offer. If the answer is NO (i.e., refusing the seller's offer), a function 336 will refuse access to the lockbox contents, and a "return" function is performed at 338. On the other hand, if the showing agent does accept the seller's offer, then the result at decision function 334 would be YES, and the logic flow is then directed to the function 340, and access would be allowed to the lockbox contents, as noted above.

As part of the decision function 334, an optional (but recommended) feature could be invoked, as follows: if the sales agent does not send an answer message within a predetermined time interval (which must also be received at the lockbox's short range wireless communications circuit 1827), then then the lockbox's processing circuit 1816 is operable to keep the secure compartment locked 1825, thereby refusing access to the secure compartment 40.

As described above, the function 340 that unlocks the secure compartment 40 is a "conditional" function, depending on the result of the decision function 332. In other words, if the sales agent is required to accept the seller's offer at decision function 334, that acceptance becomes a condition precedent before the unlocking function 340 will be allowed to occur. Therefore, if the lockbox's short range wireless communications circuit 1827 sends the seller's offer data packet (at function 320), then the lockbox's processing circuit 1816 is operable to conditionally unlock the secure compartment, thereby conditionally allowing access to the secure compartment. But in the circumstance where the condition precedent must first be met (at decision functions 332 and 334), then this conditional unlocking is of course dependent upon those events correctly taking place. Note that these functions from 330, 332, and 334 represent an optional feature, which could be invoked only at specific properties in an entire electronic lockbox system 1800—or, perhaps, they could be invoked for every property in an entire electronic lockbox system 1800. It would be up to the listing agents to decide.

Figure 3:
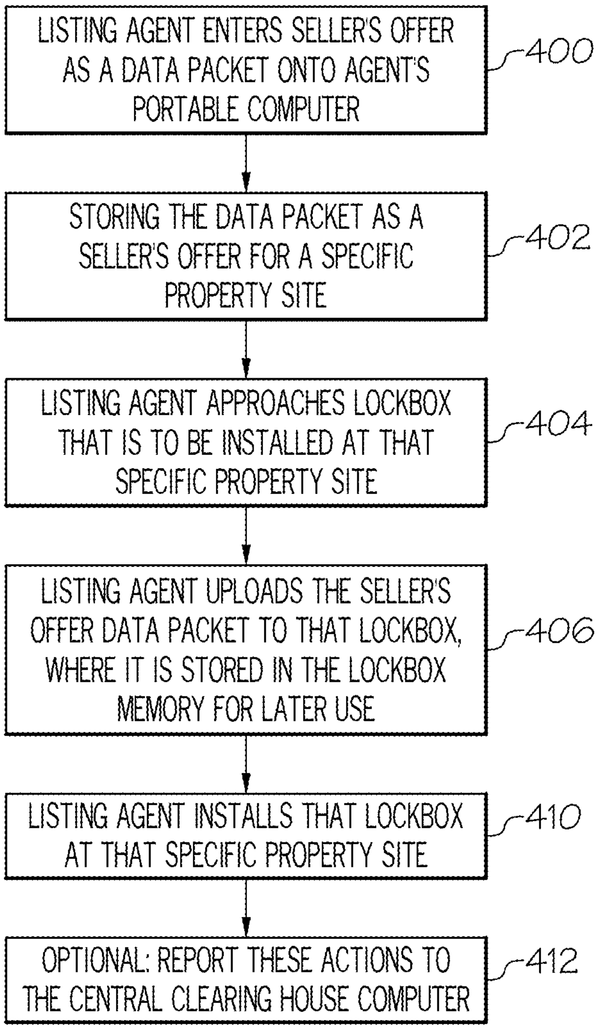
FIG. 3 is a flow chart showing some of the functions performed by a "listing agent" for the general case of uploading "seller's offer" contextual data to an electronic lockbox of the system of FIG. 1.

Referring now to FIG. 3, a flow chart is provided showing the general case in which a seller's offer is entered into a lockbox as contextual data. Beginning at a function 400, the listing agent of that specific lockbox will enter a "seller's offer" as a data packet (i.e., a "seller's offer data packet") onto that listing agent's portable computer 1840. After the data packet has been entered, that data packet will be stored in the memory 1844 of the listing agent's portable computer as a "seller's offer" for a specific property site, at a function 402.

It will be understood that, in general, the phrase "seller's offer data packet" refers to a particular set of data that can be stored in memory, and that also can be transmitted between one computer and another computer. This "seller's offer data packet" can be accessed, using a processing circuit with appropriate software (as programming instructions) so that the verbal "seller's offer" may be displayed on the touch screen display of a smart phone, for example, and this verbal "seller's offer" is also referred to herein as contextual data of the "seller's offer."

The term "data packet," as used herein, generally refers to a set of data that relates to a particular grouping of information that can be created and given a variable name (or a database entry) and stored in a computer memory, and later accessed by its variable name/database entry. If necessary, it can be reformatted into a form that is more easily displayed, or reformatted into a form that is more easily transmitted from one computer to another computer (wirelessly or otherwise), yet will still be recognizable as a "data packet" that can be received by the other computer and then displayed and/or stored in memory, as deemed appropriate by the operating software of that other computer, all without losing its essential message as contextual data that will eventually be displayed in readable form for a human user. When the data packet is received by another computer (other than the computer where it was originally created), that data packet may be given a new variable name (or database entry), as desired by that other computer's operating software, and may be reformatted as desired, again without losing its essential message to be read by a human user. It will be understood that the precise 'first' data format of a "seller's offer data packet" as created and stored in a smart phone may be quite different than a 'second' data format that would be stored in the memory of an electronic lockbox, again without losing its essential message that would later be read by a human user of a different smart phone.

The listing agent will later approach a lockbox that is to be installed at that specific property site, at a function 404. This function 404 could be physically performed anywhere, including at the listing agent's home, the office, or even at the property site itself.

Now that the listing agent's portable computer 1840 is in relatively close proximity to the lockbox 1810, the listing agent now uploads the seller's offer data packet to that lockbox, where it is stored in the lockbox memory 1822 for later use, at a function 406.

The listing agent will now install that lockbox at the specific property site, at a function 410. An optional function 412 will now be performed in which these actions of this flow chart are reported to the central clearinghouse computer 260. This function 412 normally occurs automatically the next time the listing agent uses his or her portable computer 1840 to communicate with the central clearinghouse computer 260 (which could occur almost immediately, if that listing agent is also in a communications session with the CCC 260).

More specifically, at function 412 the human listing agent who controls the wireless portable computer 1840 also controls functions of communicating an "upload successful status message" from the wireless portable computer to the central computer 260, using the WAN communications circuit 1852 to send the upload successful status message to the WAN communications circuit of the CCC (not numbered on FIG. 1); and also communicating a "lockbox installation successful status message" from the wireless portable computer 1840 to the central computer 260, again using the WAN communications circuit 1852 to send the lockbox installation successful status message to the CCC's WAN communications circuit (not numbered on FIG. 1). In general, these status messages would be stored in the database 262 of the CCC 260.

In addition to the above, it is typical for an electronic lockbox system to report an attempted access of one of its lockboxes to the central computer 260. The system 1800 would preferably be designed to perform that function, and this could be accomplished in a similar manner to the operation at function 412. For example, reporting an access attempt could be accomplished by the wireless portable computer's WAN communications circuit 1852 sending an "access status message" about every access attempt of every lockbox in this particular electronic lockbox system 1800. This access status message would then be received at the CCC's WAN communications circuit (not numbered on FIG. 1), where that access status message would be stored in the database 262, regardless of whether the access attempt was successful or not. In addition, a "seller's offer status message" would also be communicated from the agent's wireless portable computer 1840 to the CCC, using the same hardware, which would thereby inform the CCC whether or not the sales agent had accepted the seller's offer. This seller's offer status message would also then be stored in the CCC's database 262.

In a preferred electronic lockbox system 1800, reporting functions (like function 412) sent to the CCC 260 would automatically occur without any further action by the sales agent, except to place his wireless portable computer 1840 into communication with the CCC 260, using the wide area network 110 (typically the Internet and a cellular telephone circuit). Moreover, the sales agent should not have the ability to prevent these status messages from being sent to the CCC, unless that sales agent simply abandons the use of his wireless portable computer 1840 in the system 1800, which would then have other well-known negative consequences.

Therefore, if the sales agent's wireless portable computer 1840 happens to be in communication with the CCC 260 during the showing of the property site, then the access status message and the seller's offer status message are communicated to the CCC in real time—i.e., during the showing. If, however, the sales agent's wireless portable computer 1840 is not actually in communication with the CCC during the showing of the property site (e.g., if the property site is not in range with an active cellular tower), then those two status messages will be sent to the CCC 260 at a later time, for example, after the wireless portable computer 1840 becomes in range of a cellular telephone network, using at least the cellular telephone network to transmit those messages between the first and second WAN communications circuits of the wireless portable computer 1840 and the CCC 260.

Figure 4:
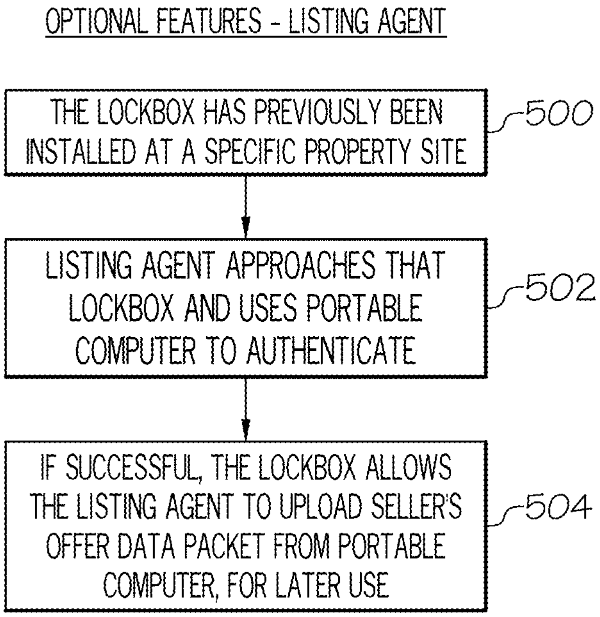
FIG. 4 is a flow chart showing some of the functions performed as optional features of the system of FIG. 1, in which an electronic lockbox has already been installed at a given property site.

Referring now to FIG. 4, a flow chart is provided that shows some of the important functions for some optional features that would be made available to a listing agent. Beginning at a function 500, it is assumed that a lockbox has previously been installed at a specific property site. The listing agent now approaches that lockbox 1810 at a function 502. Once the listing agent's portable computer 1840 is in relatively close proximity to that lockbox, the listing agent uses the portable computer to authenticate to the lockbox. If the authentication procedure is successful, a function 504 is performed in which the lockbox allows the listing agent to upload a seller's offer data packet from the listing agent's portable computer, for later use (e.g., by other sales agents).

Figure 5:
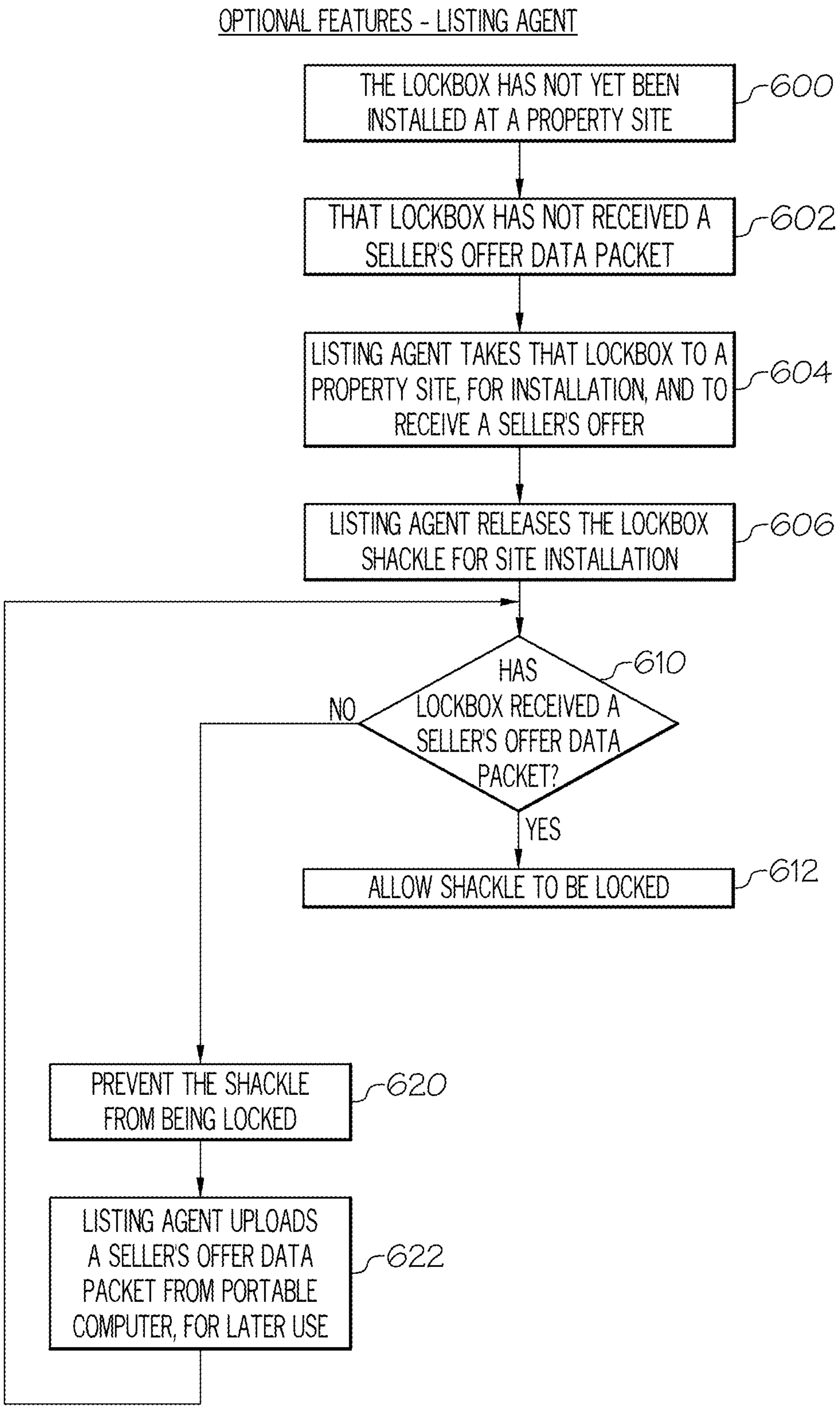
FIG. 5 is a flow chart showing some of the functions performed as optional features of the system of FIG. 1, in which an electronic lockbox has not already been installed at a given property site.

Referring now to FIG. 5, another listing agent optional feature is provided as a flow chart. Beginning with a function 600, it is assumed that a lockbox has not yet been installed at a particular property site. Furthermore, at a function 602, it is also assumed that the lockbox has not yet received a seller's offer data packet. The listing agent takes that lockbox 1810 to a specific (usually predetermined) property site, for installation at that property site, and also to receive a seller's offer into that lockbox memory 1822, at a function 604. Now that the lockbox and the listing agent (with his portable computer 1840) are physically at the predetermined property site, the listing agent performs a function 606 to release the shackle of that lockbox, for site installation.

A decision function 610 is now performed in which the lockbox 1810 determines whether or not it has already received a seller's offer data packet. If the answer is NO, a function 620 is performed that prevents the lockbox's shackle from being locked. This condition will be maintained until the listing agent uploads a seller's offer into that particular lockbox. And note, this is an optional feature, as determined by a particular listing agent for a particular lockbox to be installed at a given property site.

Since this listing agent has already instructed this lockbox 1810 to use this particular optional feature, the listing agent must now upload a seller's offer data packet from his or her portable computer 1840 to the lockbox. This is performed at a function 622 on the flow chart, and that seller's offer will be stored in the lockbox memory 1822, for later use. The logic flow is now directed back to decision function 610, which will again ask the question of whether or not the lockbox has received a seller's offer data packet. This time the result will be YES, and a function 612 will now be performed which will allow that shackle to be locked, which means that lockbox and that property site are now ready for a visit by a showing agent.

Figure 7:
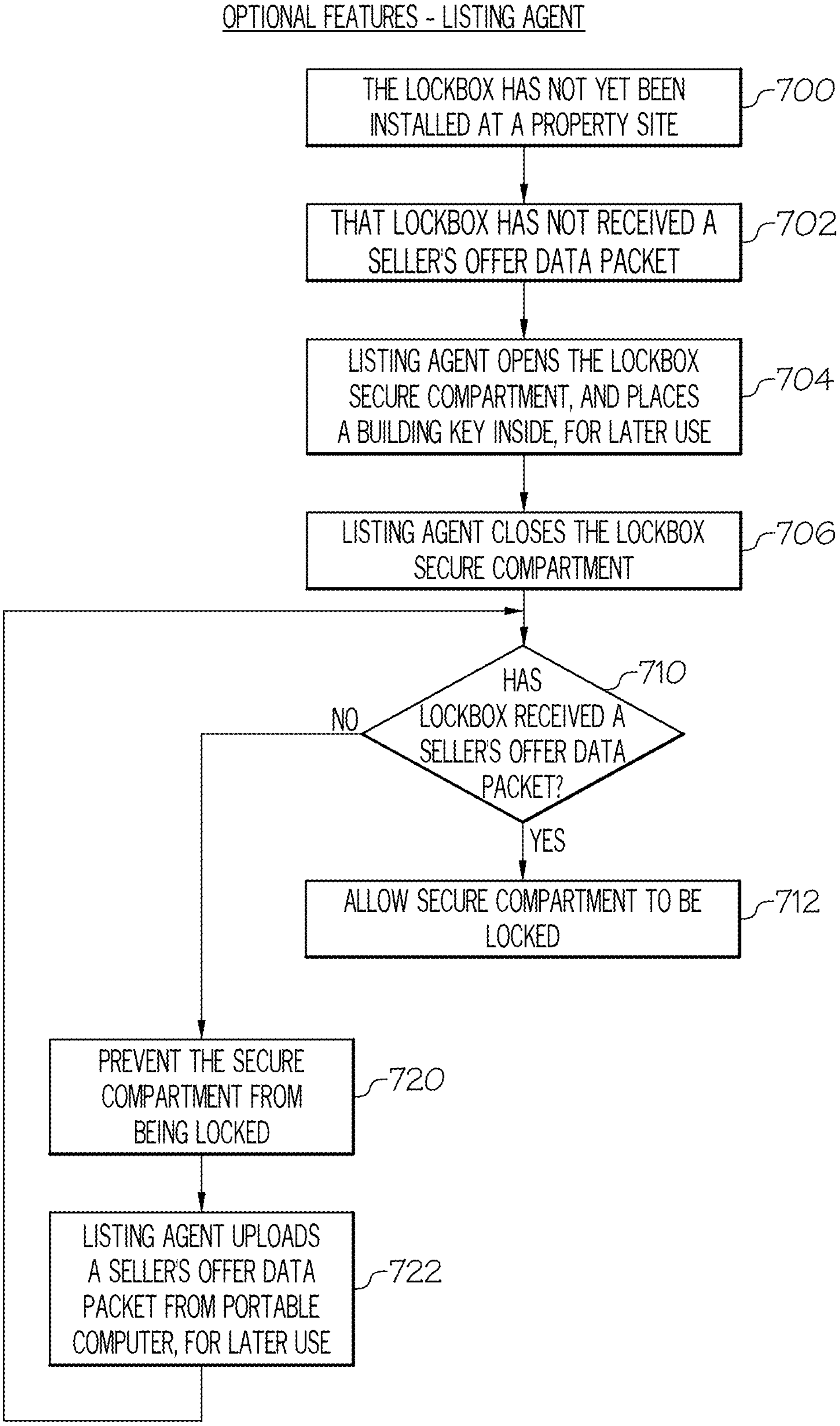
FIG. 7 is a flow chart showing some of the functions performed as another optional feature of the system of FIG. 1, in which an electronic lockbox has not already been installed at a given property site.

Referring now to FIG. 7, another listing agent optional feature is provided as a flow chart. Beginning with a function 700, it is assumed that a lockbox has not yet been installed at a particular property site. Furthermore, at a function 702, it is also assumed that the lockbox has not yet received a seller's offer data packet. At a function 704, the listing agent opens the secure compartment (i.e., the key compartment 40) and places a building key inside that secure compartment, for later use by a showing agent, after this lockbox has been installed at that property site. (It will be understood that this particular building key would be used to unlock a door or a gate at that same particular property site.)

The listing agent now closes the secure compartment, to get the lockbox ready for installation at the property site, at a function 706. Note that these actions involving functions 704 and 706 could take place anywhere—i.e., they could occur in the listing agent's home, his office, in his automobile, or at the actual property site, for example.

A decision function 710 is now performed in which the lockbox 1810 determines whether or not it has already received a seller's offer data packet. If the answer is NO, a function 720 is performed that prevents the lockbox's secure compartment from being locked. This condition will be maintained until the listing agent uploads a seller's offer into that particular lockbox. And note, this is an optional feature, as determined by a particular listing agent (or by a real estate Board) for a particular lockbox to be installed at a given property site (or perhaps for all lockboxes in a given Board's region).

Since this listing agent (or the regional Board) has already instructed this lockbox 1810 to use this particular optional feature, the listing agent must now upload a seller's offer data packet from his or her portable computer 1840 to the lockbox. This is performed at a function 722 on the flow chart, and that seller's offer will be stored in the lockbox memory 1822, for later use. The logic flow is now directed back to decision function 710, which will again ask the question of whether or not the lockbox has received a seller's offer data packet. This time the result will be YES, and a function 712 will now be performed which will allow that secure compartment to be locked, which means that lockbox is now ready for installation at the given property site.

As discussed above, it should be noted that if a given regional real estate Board decides that every lockbox in that Board's lockbox system must contain a "seller's offer," then the "optional" features described in FIGS. 5 and 7 would not be optional at all—at least not in that particular Board's region. Therefore, it would be preferred for every electronic lockbox that would have a "seller's offer" capability also have its internal computer program include an optional "flag" that allows such electronic lockboxes to be set up (configured by a user or by an administrator) to require each listing agent's lockbox to contain a seller's offer.

If the functions of the flow chart on FIG. 7 are utilized, then that lockbox will still need to be physically installed at the appropriate property site. This typically involves releasing the shackle, placing that shackle around a sturdy solid object (such as a door knob or a door handle), then re-locking the shackle into the main body of the lockbox. If desired, the functions of the flow chart on FIG. 5 could also be used, as a backup optional feature. In other words, both optional features could be employed by a single lockbox, if desired. This may be a bit overkill, but that is up to the users to decide. It should be noted that, unless some type of seller's offer is uploaded to a given lockbox, that lockbox would not have the ability to later present that seller's offer to any showing agent. So these 'optional' functions on FIGS. 5 and 7 could be vital for this type of future lockbox system to operate properly.

It will be understood that the logical operations described in relation to the flow charts of FIGS. 2-5, and 7 can be implemented using sequential logic (such as by using microprocessor technology), or using a logic state machine, or perhaps by discrete logic; it even could be implemented using parallel processors. One preferred embodiment may use a microprocessor or microcontroller (e.g., microprocessor 1816) to execute software instructions that are stored in memory cells within an ASIC. In fact, the entire microprocessor or microcontroller 1816, along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a microcomputer, a microcontroller, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information (such as the contextual data stored, for example, in memory circuit 1822), or perhaps by a type of memory device not yet invented. In general, the memory circuit of a particular electronic product will contain instructions that are executable by the processing circuit of that same particular electronic product.

It will also be understood that the precise logical operations depicted in the flow charts of FIGS. 2-5, and 7, and discussed above, could be somewhat modified to perform similar, although perhaps not exact, functions without departing from the principles of the technology disclosed herein. The exact nature of some of the decisions and other commands in these flow charts are directed toward specific future models of electronic lockbox systems (those involving lockboxes sold by SentriLock, LLC, for example) and certainly similar, but somewhat different, functions/decisions would be taken for use with other models or brands of lockbox systems in many instances, with the overall inventive results being the same.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

Additionally, it will be understood that a computing product that includes a display to show information to a human user, and that also includes a "user operated input circuit" so the human user is able to enter commands or data, can be provided with a single device that is known as a "touchscreen display." In other words, if a patent claim recites a "display" and a "user operated input circuit" as two separate elements, then a single touchscreen display, in actually, is exactly the same thing. It should be noted that a touchscreen display usually includes a virtual keypad, and therefore, a "user operated input circuit" typically comprises a virtual keypad, particularly on smart phones and on tablet computers. Moreover, in this situation, the word "virtual" means that it is not a hardware keypad; more specifically, "virtual" means that it is formed (i.e., "created") on the display screen because of software being executed by a processing circuit.

Some additional information about "basic" lockbox embodiments, including advanced features, are more fully described in earlier patent documents by some of the same inventors, and assigned to SentriLock, Inc. or SentriLock LLC, including: U.S. Pat. No. 7,009,489, issued Mar. 7, 2006, for ELECTRONIC LOCK SYSTEM AND METHOD FOR ITS USE; U.S. Pat. No. 6,989,732, issued Jan. 24, 2006, for ELECTRONIC LOCK SYSTEM AND METHOD FOR ITS USE WITH CARD ONLY MODE; U.S. Pat. No. 7,086,258, issued Aug. 8, 2006, for ELECTRONIC LOCK BOX WITH SINGLE LINEAR ACTUATOR OPERATING TWO DIFFERENT LATCHING MECHANISMS; U.S. Pat. No. 7,420,456, issued Sep. 2, 2008, for ELECTRONIC LOCK BOX WITH MULTIPLE MODES AND SECURITY STATES; U.S. Pat. No. 7,193,503, issued Mar. 20, 2007, for ELECTRONIC LOCK SYSTEM AND METHOD FOR ITS USE WITH A SECURE MEMORY CARD; U.S. Pat. No. 7,999,656, issued Aug. 16, 2011, for ELECTRONIC LOCK BOX WITH KEY PRESENCE SENSING; U.S. Pat. No. 7,734,068, issued Jun. 8, 2010, for ELECTRONIC LOCK BOX USING A BIOMETRIC IDENTIFICATION DEVICE; U.S. Pat. No. 8,451,088, issued May 28, 2013, for ELECTRONIC LOCK BOX WITH TRANSPONDER BASED COMMUNICATIONS; U.S. Pat. No. 8,164,419, issued Apr. 24, 2012, for ELECTRONIC LOCK BOX WITH TIME-RELATED DATA ENCRYPTION BASED ON USER-SELECTED PIN; U.S. Pat. No. 8,151,608, issued Apr. 10, 2012, for ELECTRONIC LOCK BOX WITH MECHANISM IMMOBILIZER FEATURES; U.S. Pat. No. 9,208,466, issued on Nov. 18, 2015, for ELECTRONIC LOCK BOX SYSTEM WITH INCENTIVIZED FEEDBACK; U.S. Pat. No. 8,593,252, issued Nov. 26, 2013, for ELECTRONIC LOCK BOX PROXIMITY ACCESS CONTROL; U.S. Pat. No. 8,912,884, issued Dec. 16, 2014, for ELECTRONIC KEY LOCKOUT CONTROL IN LOCKBOX SYSTEM; U.S. Pat. No. 9,053,629, issued on May 20, 2015, for CONTEXTUAL DATA DELIVERY TO MOBILE USERS RESPONSIVE TO ACCESS OF AN ELECTRONIC LOCKBOX; U.S. Pat. No. 9,478,083, issued on Oct. 5, 2016, for ELECTRONIC KEY LOCKOUT CONTROL IN LOCKBOX SYSTEM; U.S. Pat. No. 9,704, 315, issued on Jun. 21, 2017, for CONTEXTUAL DATA DELIVERY TO OTHER USERS AT AN ELECTRONIC LOCKBOX; U.S. Pat. No. 10,068,399, issued on Aug. 21, 2018, for CONTEXTUAL DATA DELIVERY TO OTHER USERS AT AN ELECTRONIC LOCKBOX; U.S. Pat. No. 10,026,250, issued on Jun. 27, 2018, for CONTEXTUAL DATA DELIVERY TO USERS AT A LOCKED PROPERTY; U.S. patent application No. 2020/0308870, published on Oct. 1, 2020, for IMPROVED ELECTRONIC LOCKBOX; U.S. patent application No. 2020/0308868, published on Oct. 1, 2020, for IMPROVED ELECTRONIC LOCKBOX; U.S. patent application No. 2020/0308869, published on Oct. 1, 2020, for IMPROVED ELECTRONIC LOCKBOX; U.S. patent application No. 2020/0312067, published on Oct. 1, 2020, for IMPROVED ELECTRONIC LOCKBOX; and U.S. patent application No. 2020/0308871, published on Oct. 1, 2020, for IMPROVED ELECTRONIC LOCKBOX. These patent documents are incorporated by reference herein, in their entirety.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two (male and female) structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two (male and female) structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. An electronic lockbox system, the system comprising:

(a) an electronic lockbox, having a first processing circuit, a first memory circuit including instructions executable by the first processing circuit, a first short range wireless communications circuit, and a secure compartment having a movable lock that is under the control of the first processing circuit, wherein the electronic lockbox is assigned to a first specific property;

(b) a wireless portable computer, having a second processing circuit, a second memory circuit including instructions executable by the second processing circuit, a first visual display, a first data entry circuit, a second short range wireless communications circuit, and a first WAN communications circuit for communicating with a wide area network, the wireless portable computer being assigned to a sales agent;

(c) the first memory circuit contains a seller's offer data packet that may be displayed as contextual data on a visual display of another computer, and the second memory circuit contains authorization data that may be used to access a lockbox that is part of the electronic lockbox system; and (d) wherein the first and second processing circuits are programmed with computer code to perform functions of:

(i) the sales agent begins an authorization routine in which the wireless portable computer sends a credentials message to the electronic lockbox, using the authorization data stored in the second memory circuit, and using the second short range wireless communications circuit;

(ii) the electronic lockbox receives the credentials message, using the first short range wireless communications circuit;

(iii) using the first processing circuit, the electronic lockbox determines whether or not the credentials message is authorized to unlock the electronic lockbox, and:

(A) if not, then to deny access to the secure compartment, and refusing to send a seller's offer data message to the wireless portable computer, or (B) if so, then to send the seller's offer data message to the wireless portable computer, using the first short range wireless communications circuit;

(iv) if the second short range wireless communications circuit receives the seller's offer data message, then the second processing circuit is operable to display the seller's offer data message as contextual data on the first visual display; and (v) if the first short range wireless communications circuit sends the seller's offer data message, then the first processing circuit is operable to conditionally unlock the secure compartment, thereby conditionally allowing access to the secure compartment.

2. The electronic lockbox system of claim 1, wherein:

(a) the first processing circuit is operable to determine if the sales agent is required to accept the seller's offer before conditionally allowing access to the secure compartment;

(b) if the sales agent is required to accept the seller's offer as a condition precedent, then the first processing circuit is operable to determine if the sales agent has indicated acceptance of the seller's offer, wherein:

(i) the first processing circuit is operable to send an acceptance query message, using the first short range wireless communications circuit, in which the acceptance query message asks the sales agent to accept the seller's offer;

(ii) the second processing circuit is operable to receive the acceptance query message, using the second short range wireless communications circuit, and to display the acceptance query message as contextual data on the first visual display;

(iii) if the sales agent decides to respond to the acceptance query message, the second processing circuit is operable to send an answer message, using the second short range wireless communications circuit; and (c) depending upon the answer message to the acceptance query:

(i) if the sales agent has indicated acceptance, then the first processing circuit is operable to unlock the secure compartment, thereby allowing access to the secure compartment; or (ii) if the sales agent has not indicated acceptance, then the first processing circuit is operable to keep the secure compartment locked, thereby refusing access to the secure compartment.

3. The electronic lockbox system of claim 2, wherein: if the sales agent does not send an answer message within a predetermined time interval, then then the first processing circuit is operable to keep the secure compartment locked, thereby refusing access to the secure compartment.

4. The electronic lockbox system of claim 1, further comprising:

(a) a central computer, having a third processing circuit, a third memory circuit including instructions executable by the third processing circuit, and a second WAN communications circuit for communicating with the wide area network;

(b) the third memory circuit also including a database containing information:

(i) about a plurality of properties, (ii) about a plurality of electronic lockboxes that are assigned to the plurality of properties, and (iii) about a plurality of wireless portable computers that are assigned to a plurality of sales agents who are registered with the central computer; and (c) wherein the third and second processing circuits are programmed with computer code to perform functions of:

(i) to communicate an access status message about an access attempt by the wireless portable computer of the electronic lockbox, using the first WAN communications circuit to send the access status message to the second WAN communications circuit; and (ii) to communicate a seller's offer status message about whether or not the sales agent accepted the seller's offer, using the first WAN communications circuit to send the seller's offer status message to the second WAN communications circuit.

5. The electronic lockbox system of claim 4, wherein:

(a) the access status message and the seller's offer status message are communicated from the wireless portable computer to the central computer in real time, while the sales agent is also using the wireless portable computer to communicate with the electronic lockbox, using at least a cellular telephone network to transmit those messages between the first and second WAN communications circuits; or (b) the access status message and the seller's offer status message are communicated from the wireless portable computer to the central computer at a later time, after the wireless portable computer becomes in range of a cellular telephone network, using at least the cellular telephone network to transmit those messages between the first and second WAN communications circuits.

6. A method for using an electronic lockbox system, the method comprising:

(a) providing an electronic lockbox, which includes a first processing circuit, a first memory circuit including instructions executable by the first processing circuit, a first short range wireless communications circuit, and a secure compartment having a movable lock that is under the control of the first processing circuit, wherein the electronic lockbox is assigned to a first specific property;

(b) providing a wireless portable computer, which includes a second processing circuit, a second memory circuit including instructions executable by the second processing circuit, a first visual display, a first data entry circuit, a second short range wireless communications circuit, and a first WAN communications circuit for communicating with a wide area network, the wireless portable computer being assigned to a sales agent;

(c) storing a seller's offer data packet in the first memory circuit, in which the seller's offer data packet may be displayed as contextual data on a visual display of another computer;

(d) storing authorization data in the second memory circuit, in which the authorization data may be used to access a lockbox that is part of the electronic lockbox system; and (e) beginning an authorization routine in which the sales agent causes the wireless portable computer to send a credentials message to the electronic lockbox, using the authorization data stored in the second memory circuit, and using the second short range wireless communications circuit;

(f) receiving the credentials message at the electronic lockbox, using the first short range wireless communications circuit;

(g) determining whether or not the credentials message is authorized to unlock the electronic lockbox, using the first processing circuit, and:

(i) if not, then denying access to the secure compartment, and refusing to send a seller's offer data message to the wireless portable computer, or (ii) if so, then sending the seller's offer data message to the wireless portable computer, using the first short range wireless communications circuit;

(h) if the second short range wireless communications circuit receives the seller's offer data message, then displaying the seller's offer data message as contextual data on the first visual display, under the control of the second processing circuit; and (i) if the second short range wireless communications circuit receives the seller's offer data message, then conditionally unlocking the secure compartment, and thereby conditionally allowing access to the secure compartment, under the control of the second processing circuit.

7. The method of claim 6, further comprising:

(a) determining, using the first processing circuit, if the sales agent is required to accept the seller's offer before conditionally allowing access to the secure compartment;

(b) if the sales agent is required to accept the seller's offer as a condition precedent, then determining, using the first processing circuit, if the sales agent has indicated acceptance of the seller's offer, by:

(i) sending an acceptance query message, under the control of the first processing circuit and using the first short range wireless communications circuit, in which the acceptance query message asks the sales agent to accept the seller's offer;

(ii) receiving the acceptance query message, using the second short range wireless communications circuit, and displaying the acceptance query message as contextual data on the first visual display, under the control of the second processing circuit; and (iii) if the sales agent decides to respond to the acceptance query message, then sending an answer message, using the second short range wireless communications circuit, and under the control of the second processing circuit; and (c) depending upon the answer message to the acceptance query:

(i) if the sales agent has indicated acceptance, then unlocking the secure compartment, under the control of the first processing circuit, thereby allowing access to the secure compartment; or (ii) if the sales agent has not indicated acceptance, then keeping the secure compartment locked, under the control of the first processing circuit, thereby refusing access to the secure compartment.

8. The method of claim 7, further comprising: if the sales agent does not send an answer message within a predetermined time interval, then keeping the secure compartment locked, under the control of the first processing circuit, thereby refusing access to the secure compartment.

9. The method of claim 6, further comprising:

(a) providing a central computer, which includes a third processing circuit, a third memory circuit including instructions executable by the third processing circuit, and a second WAN communications circuit for communicating with the wide area network;

(b) the third memory circuit also including a database containing information:

(i) about a plurality of properties, (ii) about a plurality of electronic lockboxes that are assigned to the plurality of properties, and (iii) about a plurality of wireless portable computers that are assigned to a plurality of sales agents who are registered with the central computer; and (c) communicating an access status message about an access attempt by the wireless portable computer of the electronic lockbox, using the first WAN communications circuit to send the access status message to the second WAN communications circuit; and (d) communicating a seller's offer status message about whether or not the sales agent accepted the seller's offer, using the first WAN communications circuit to send the seller's offer status message to the second WAN communications circuit.

10. The method of claim 9, further comprising:

(a) communicating the access status message and the seller's offer status message from the wireless portable computer to the central computer in real time, while the sales agent is also using the wireless portable computer to communicate with the electronic lockbox, using at least a cellular telephone network to transmit those messages between the first and second WAN communications circuits; or (b) communicating the access status message and the seller's offer status message from the wireless portable computer to the central computer at a later time, after the wireless portable computer becomes in range of a cellular telephone network, using at least the cellular telephone network to transmit those messages between the first and second WAN communications circuits.

11. An electronic lockbox system, the system comprising:

(a) an electronic lockbox, having a first processing circuit, a first memory circuit including instructions executable by the first processing circuit, a first short range wireless communications circuit, and a secure compartment having a movable lock that is under the control of the first processing circuit, wherein the electronic lockbox is assigned to a first specific property;

(b) a wireless portable computer, having a second processing circuit, a second memory circuit including instructions executable by the second processing circuit, a first visual display, a first data entry circuit, a second short range wireless communications circuit, and a first WAN communications circuit for communicating with a wide area network, the wireless portable computer being assigned to a sales agent;

(c) the first memory circuit contains a seller's offer data packet that may be displayed as contextual data on a visual display of another computer, and the second memory circuit 201 contains authorization data that may be used to access a lockbox that is part of the electronic 202 lockbox system; and (d) wherein the first and second processing circuits are programmed with computer code to perform functions of:

(i) the sales agent begins an authorization routine in which the wireless portable computer sends a credentials message to the electronic lockbox, using the 207 authorization data stored in the second memory circuit, and using the second short range wireless communications circuit; 209

(ii) the electronic lockbox receives the credentials message, using the first short range wireless communications circuit;

(iii) using the first processing circuit, the electronic lockbox determines whether or not the credentials message is authorized to unlock the electronic lockbox, and:

(A) if not authorized, then to deny access to the secure compartment, or (B) if authorized, then:

(i) to send the seller's offer data packet to the wireless portable computer, using the first short range wireless communications circuit;

(ii) to display the seller's offer data packet as contextual data on the first visual display, under control of the second processing circuit; and (iii) to require the sales agent to accept or reject the displayed seller's offer using the first data entry circuit, and the second processing circuit.

12. The electronic lockbox system of claim 11, wherein:

(a) an answer message is transmitted from the second short range wireless communication circuit to the first short range wireless communications circuit; and (b) if the answer message accepts the seller's offer, then the first processing circuit allows access to the secure compartment.

13. The electronic lockbox system of claim 11, wherein:

(a) an answer message is transmitted from the second short range wireless communication circuit to the first short range wireless communications circuit; and (b) if the answer message rejects the seller's offer, then the first processing circuit denies access to the secure compartment.

14. The electronic lockbox system of claim 11, wherein: if the sales agent does not send an answer message within a predetermined time interval, then then the first processing circuit is operable to keep the secure compartment locked, thereby refusing access to the secure compartment.

15. The electronic lockbox system of claim 11, further comprising:

(a) a central computer, having a third processing circuit, a third memory circuit including instructions executable by the third processing circuit, and a second WAN communications circuit for communicating with the wide area network;

(b) the third memory circuit also including a database containing information:

(i) about a plurality of properties, (ii) about a plurality of electronic lockboxes that are assigned to the plurality of properties, and (iii) about a plurality of wireless portable computers that are assigned to a plurality of sales agents who are registered with the central computer; and (c) wherein the third and second processing circuits are programmed with computer code to perform functions of:

(i) to communicate an access status message about an access attempt by the wireless portable computer of the electronic lockbox, using the first WAN communications circuit to send the access status message to the second WAN communications circuit; and (ii) to communicate a seller's offer status message about whether or not the sales agent accepted the seller's offer, using the first WAN communications circuit to send the seller's offer status message to the second WAN communications circuit.

16. The electronic lockbox system of claim 15, wherein:

(a) the access status message and the seller's offer status message are communicated from the wireless portable computer to the central computer in real time, while the sales agent is also using the wireless portable computer to communicate with the electronic lockbox, using at least a cellular telephone network to transmit those messages between the first and second WAN communications circuits; or (b) the access status message and the seller's offer status message are communicated from the wireless portable computer to the central computer at a later time, after the wireless portable computer becomes in range of a cellular telephone network, using at least the cellular telephone network to transmit those messages between the first and second WAN communications circuits.

* * * * *